United States Patent
Wagner

[11] 3,894,597
[45] July 15, 1975

[54] DIAGONAL BRACE FOR TRACTOR FRAME OF TRACK-LAYING TRACTOR

[75] Inventor: Joseph Francis Wagner, Dubuque, Iowa

[73] Assignee: Deere & Company, Moline, Ill.

[22] Filed: May 1, 1974

[21] Appl. No.: 465,749

[52] U.S. Cl. .................. 180/9.48; 403/388; 305/16
[51] Int. Cl.² ............................................ B62D 55/00
[58] Field of Search ............ 305/16, 37, 60, 21, 22, 305/23, 24, 25, 26, 27, 28, 60; 180/9.48; 403/388, 393

[56] References Cited
UNITED STATES PATENTS
2,297,485   9/1942   Lentz................................ 180/9.48

Primary Examiner—Philip Goodman

[57] ABSTRACT

A track-laying tractor includes longitudinally extending track frames at its opposite sides, the track frames being secured to the main frame of the body of the tractor through means including a rear transverse pivot shaft to which rear portions of the track frame are journaled. Each of the track frames is secured to the pivot shaft at respective inboard locations through means of a diagonal brace, the diagonal brace of each track frame being made of first and second sections interconnected by a joint assembly including a piece of key stock received in a transverse keyway formed by cooperating recesses in the first and second sections, the first and second sections being clamped together through means of bolts disposed on opposite sides of the keyway.

7 Claims, 3 Drawing Figures

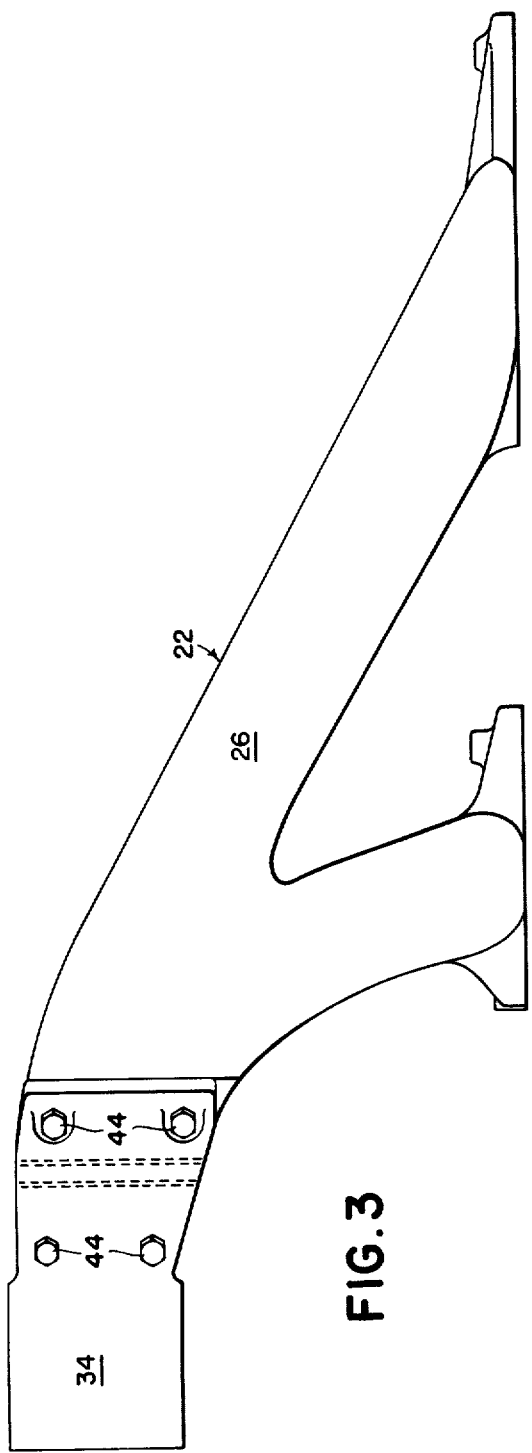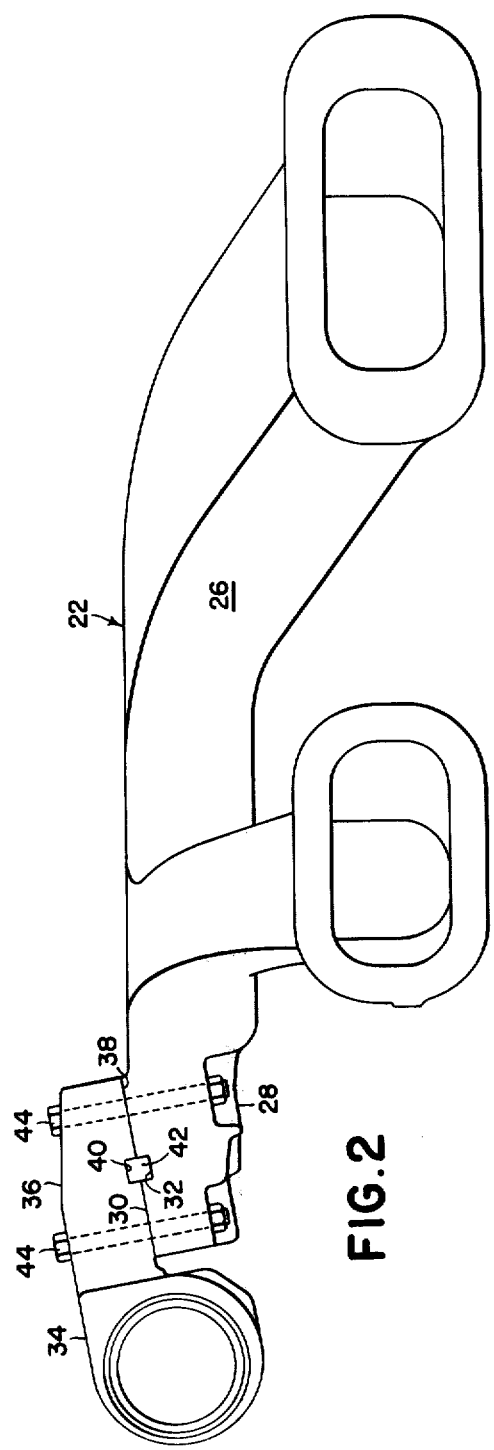

DIAGONAL BRACE FOR TRACTOR FRAME OF TRACK-LAYING TRACTOR

BACKGROUND OF THE INVENTION

The present invention relates to a track frame for a track-laying tractor and more particularly relates to a diagonal brace structure of such a track frame.

Track-laying tractors are normally provided at their opposite sides with fore-and-aft extending track frames having main portions supporting drive and idler sprockets at their rear and forward ends. The main portions of the track frames are normally pivotally mounted on the opposite ends of a transversely extending pivot shaft which is secured to the body of the tractor. For the purpose of absorbing side thrusts or forces imposed upon the track frames, it is common practice to provide them with diagonal braces which extend inwardly and rearwardly from locations intermediate the front and rear ends of the main part of the track frame, the rear ends of the diagonal braces being journaled for rotation on the transverse pivot shaft.

In the past, these diagonal braces have been made of unitary structures welded to the main part of the track frame necessitating either the removal of the transverse shaft or the sliding of the track frame brace along the transverse shaft in order to service the track frame. Since the track frames are quite heavy, the procedure of removing the track frame brace by sliding it along the transverse shaft is quite difficult, while the alternative of removing the transverse shaft is not desirable since it requires that the transverse shaft be disconnected from the body or chassis.

Furthermore, as can be seen from U.S. Pat. No. 2,304,075 granted to Davidson et al. on Dec. 8, 1974, it is a common practice to use the transverse shaft as a mount for the final drive sprocket thus necessitating that the final drive can be disassembled whenever it is desired to service the track frame. This disassembly is tedious and time consuming.

SUMMARY OF THE INVENTION

According to the present invention, there is provided a track frame having a novel diagonal brace.

It is a broad object of the invention to provide a diagonal brace which may be disconnected from a transverse pivot shaft fixed to the main body of a track-laying vehicle without necessitating the sliding of the brace along the shaft nor the removal of the shaft from the vehicle body frame. More specifically, it is an object of the invention to provide a diagonal brace, as just described, which is made in first and second sections, one section being integral with the main fore-and-aft extending portion of the track frame and the second section being journaled for rotation on the transverse pivot shaft and releasably secured to the first section.

A more specific object is to provide a diagonal brace, of the type aforedescribed, including first and second sections releasably interconnected so as to form a joint assembly, the joint assembly being constructed such that forces acting on the joint structure due to side thrusts on the track frames are not transferred to releasable fasteners securing the two brace sections together.

Yet a more specific object is to provide a joint structure, as just described, which includes a transverse keyway formed by cooperating recesses in the first and second sections, a piece of key stock located in the recess and bolts extending through the first and second sections at opposite sides of the keyway.

A further object of the invention is to provide a transverse shaft having inner locations which are reduced in diameter from locations adjacent the opposite ends of the transverse shaft and the second sections of the diagonal braces journaled on the reduced diameter portions.

These and other objects will become apparent from reading the ensuing description together with the appended drawings.

BRIEF DESCRIPTION OF THE DRAWINGS

FIG. 2 is a right side elevational view of the left diagonal brace shown in FIG. 1.

FIG. 3 is a top plan view of the diagonal brace shown in FIG. 1.

DESCRIPTION OF THE PREFERRED EMBODIMENT

Figure 1:
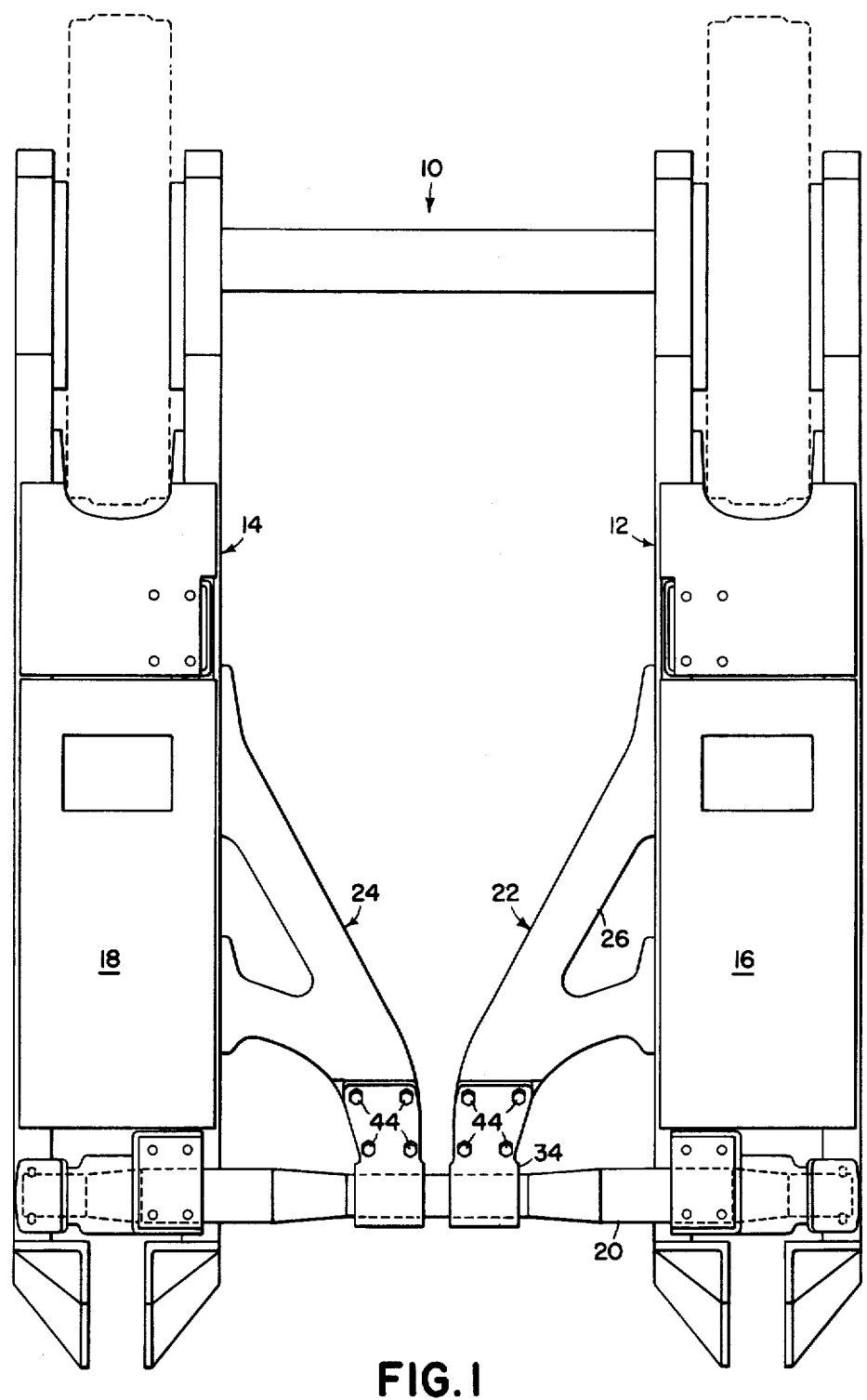
FIG. 1 is a top plan view of the opposite track frames of a track-laying tractor.

Referring now to FIG. 1, therein is shown a track frame assembly indicated in its entirety by the reference numeral 10. The track frame assembly 10 is of the general type associated with track-laying tractors and includes right and left track frames 12 and 14, respectively, shown here with many details omitted for simplicity. The frames 12 and 14 serve to support endless track members (not shown) and for that purpose include respective longitudinally extending main frame portions 16 and 18 about which the endless track members pass. The rear ends of the frame portion 16 and 18 are supported from the main body (not shown) of a vehicle through means of a horizontal transverse pivot shaft 20 which is rigidly fixed in the body and has its opposite ends journaled in the frame portion 16 and 18. For the purpose of counteracting side loads which may be imposed on the track frames during turning operations of the vehicle with which they are associated, the frames 12 and 14 respectively include diagonal braces 22 and 24 which respectively extend between the main frame portion 16 and 18 and the pivot shaft 20.

The right diagonal brace 22 includes a forward section 26 fixed, as by welding, to the inner side of the main frame portion 16 at a location intermediate the front and rear ends thereof. The brace section 26 extends inwardly and rearwardly and terminates at a rear end portion 28 located just forwardly of the pivot shaft 20. The rear end portion 28 has an upper surface 30 which is planar except for a transverse recess 32 extending in parallel relationship to the pivot shaft 20. The diagonal brace 22 further includes a rear section 34 which is journaled on the pivot shaft 20 and includes a forward end portion 36 overlying and having a bottom surface 38 shaped complementary to and in bearing engagement with the upper surface 30 of the forward brace section 26. Located in the bottom surface 38 is a downwardly opening transverse recess 40 which cooperates with the recess 32 to form a transverse receptacle or keyway in which is received a piece of key stock 42. The rear end portion 28 of the forward brace section 26 and the forward end portion 36 of the rear brace section 34 are clamped together through means of a plurality of bolts 44 which are arranged such that a first pair is located forwardly of the key stock 42 while a second pair is located rearwardly of the key stock 42. It is to be noted that the interface at the connection of the brace sections 26 and 34 lies in a plane which intersects the axis of the pivot shaft 20. Thus, loads acting sideways on the track frames will be transferred to the pivot shaft 20 and it is important to note that the key stock 42 will act to transfer the brunt of the force from the section 26 to the section 34 and will thus act to prevent unduly large shear forces from being imposed on the bolts 44.

Except for being designed for the left frame 14, the left diagonal brace 24 is similar to the right brace 22 and no further discussion thereof is thought necessary.

It is to be noted that while the pivot shaft 20 to which the diagonal braces 22 and 24 are connected is illustrated as a one-piece member, separate pivot shafts may be provided for the right and left track frames 12 and 14.

The operation of the invention is as follows. Side loads imposed upon the right and left track frames 12 and 14 will be transferred to the main body of the vehicle through means of the diagonal braces 12 and 14 and the transverse pivot shaft 20. Taking as an example the condition wherein forces are imposed inwardly on the right track frame 12, forces will be transmitted from the main track frame portion 16 to the forward diagonal brace section 26 through the key stock 42 to the rear diagonal brace section 34 and then to the pivot shaft 20. Very little of this force will be transferred through the bolts 44.

Assuming that it is necessary to remove the right track frame 12 in order to service some of the parts carried thereby, this can be done by disconnecting the main frame portion 16 from the outer end of the pivot shaft 20 and by removing the bolts 44 which interconnect the front and rear sections of the diagonal brace 22. The frame 12 can then be shifted laterally outwardly.

I claim:

1. In a track frame assembly of the type including transversely spaced track frames including fore-and-aft extending main frame portions, a transverse horizontal pivot shaft means extending between and connected to the main frame portions at rearward locations thereof, and each frame including an inwardly and rearwardly extending diagonal brace secured to the main frame portion thereof and having a rear end pivotally connected to the pivot shaft means, the improvement comprising: each diagonal brace including separate front and rear sections; said separate front and rear sections having respective opposed surfaces including engaged bearing surfaces defining an interface located in a generally horizontal plane, said opposed surfaces defining opposite recesses cooperating to form a transverse keyway; a piece of key stock tightly received in the keyway; and releasable fastener means securing the front and rear sections together whereby the track frames can be serviced without sliding the pivot shaft means out through the frames or without sliding the diagonal braces along the pivot shaft means.

2. The track frame assembly defined in claim 1 wherein said interface lies in a plane containing the axis of said pivot shaft means.

3. The track frame assembly defined in claim 1 wherein the key way extends generally parallel to the pivot shaft means.

4. The track frame assembly defined in claim 1 wherein said pivot shaft means includes an inner portion means reduced in diameter relative to adjacent outer portions; and said diagonal braces being rotatably mounted on the inner portion means.

5. In a track frame assembly of a type including a pair of transversely spaced track frames including main frame portions extending longitudinally and having rear end portions pivotally mounted on opposite ends of a transverse horizontal pivot shaft means and each track frame including an inwardly and rearwardly projecting diagonal brace secured to the main portion thereof and having a rearward end journaled for rotation on said pivot shaft means, the improvement comprising: said diagonal braces each including a separable joint means located between the main frame portion of a respective track frame and the pivot shaft means and including respective upwardly and downwardly facing surfaces in bearing engagement with each other; a transverse keyway formed in part by a recess interrupting the upwardly facing surface and in part by a recess interrupting the downwardly facing surface; a key member tightly received in said keyway; and releasable fastener means holding the surfaces in engagement with each other and said recesses in capturing engagement with said key member.

6. The track frame assembly defined in claim 5 wherein the upwardly and downwardly facing surfaces are planar and meet in a plane which contains the axis of the pivot shaft means.

7. The track frame assembly defined in claim 6 wherein the releasable fastener means includes a first and second pairs of generally upright bolts respectively located in the diagonal brace forwardly and rearwardly of the keyway.

* * * * *